(12) United States Patent
Miyazaki et al.

(10) Patent No.: US 9,108,635 B2
(45) Date of Patent: Aug. 18, 2015

(54) CONTROL DEVICE OF HYBRID VEHICLE (75) Inventors: Terufumi Miyazaki, Toyota (JP);
Yukihiko Ideshio, Nisshin (JP);
Toshihiko Kamiya, Toyota (JP); Shingo Eto, Gamagori (JP); Hironori Asaoka, Nisshin (JP); Yasuyuki Kato, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/979,195

(22) PCT Filed: Jan. 12, 2011

(86) PCT No.: PCT/JP2011/050365
§ 371 (c)(1),
(2), (4) Date: Jul. 11, 2013

(87) PCT Pub. No.: WO2012/095963
PCT Pub. Date: Jul. 19, 2012

(65) Prior Publication Data
US 2013/0288853 A1 Oct. 31, 2013

(51) Int. Cl.
*B60W 10/02* (2006.01)
*B60W 20/00* (2006.01)
*B60K 6/48* (2007.10)
*B60W 50/038* (2012.01)

(52) U.S. Cl.
CPC .............. *B60W 20/1082* (2013.01); *B60K 6/48* (2013.01); *B60W 10/02* (2013.01); *B60W 20/00* (2013.01); *B60W 20/50* (2013.01); *B60W 50/038* (2013.01); *B60W 2710/0644* (2013.01); *Y02T 10/6221* (2013.01); *Y10S 903/902* (2013.01); *Y10T 477/26* (2015.01)

(58) Field of Classification Search
USPC .......... 477/5, 3, 166, 181; 180/65.275, 65.21, 180/65.1, 65.285
See application file for complete search history.

(56) References Cited

U.S. PATENT DOCUMENTS

| 7,654,931 | B2 * | 2/2010 | Popp et al. .................... 477/4 |
| 7,708,095 | B2 * | 5/2010 | Hirata ..................... 180/65.275 |
| 7,892,139 | B2 * | 2/2011 | Kaltenbach ..................... 477/5 |
| 7,954,581 | B2 * | 6/2011 | Tanishima .............. 180/65.275 |
| 8,113,309 | B2 * | 2/2012 | Allgaier ................... 180/65.265 |
| 8,123,657 | B2 * | 2/2012 | Mittelberger et al. ............ 477/5 |

(Continued)

FOREIGN PATENT DOCUMENTS

| DE | 10 2009 027 641 | 1/2011 |
| DE | 10 2009 027 642 | 1/2011 |

(Continued)

*Primary Examiner* — Ramya Burgess
*Assistant Examiner* — David J Hlavka
(74) *Attorney, Agent, or Firm* — Finnegan, Henderson, Farabow, Garrett & Dunner, LLP (57) ABSTRACT It is provided a control device of a hybrid vehicle having a clutch in a power transmission path between an engine and a motor generator, the clutch controlling power transmission through the power transmission path depending on an engagement state, the hybrid vehicle interrupting the power transmission through the power transmission path by releasing the clutch during EV running while only the motor generator is used as a drive source for running, during the EV running while a release instruction for the clutch is output, if the engine being driven, a rotation speed of the engine is maintained within a predetermined rotation speed difference from a rotation speed of the motor generator.

1 Claim, 4 Drawing Sheets

(56) References Cited

U.S. PATENT DOCUMENTS

| | | | |
|---|---|---|---|
| 8,142,328 B2* | 3/2012 | Reuschel | 477/6 |
| 8,192,324 B2* | 6/2012 | Kraska et al. | 477/5 |
| 8,246,509 B2* | 8/2012 | Mittelberger et al. | 477/5 |
| 8,249,768 B2* | 8/2012 | Mori et al. | 701/22 |
| 8,292,779 B2* | 10/2012 | Kaltenbach et al. | 477/5 |
| 8,298,117 B2* | 10/2012 | Seel et al. | 477/5 |
| 8,328,681 B2* | 12/2012 | Kaltenbach et al. | 477/5 |
| 2010/0292047 A1* | 11/2010 | Saito | 477/5 |
| 2010/0304923 A1* | 12/2010 | Schenk et al. | 477/5 |
| 2010/0312427 A1* | 12/2010 | Ueno | 701/22 |
| 2011/0009237 A1* | 1/2011 | Kim et al. | 477/5 |
| 2011/0021312 A1* | 1/2011 | Fukitani | 477/5 |
| 2011/0039655 A1* | 2/2011 | Kaltenbach et al. | 477/5 |
| 2011/0045947 A1* | 2/2011 | Kaltenbach et al. | 477/5 |
| 2011/0287889 A1* | 11/2011 | Eisele et al. | 477/5 |

FOREIGN PATENT DOCUMENTS

| | | |
|---|---|---|
| JP | 2004-114771 | 4/2004 |
| JP | 2006-017042 | 1/2006 |
| JP | 2009-001172 | 1/2009 |
| JP | 2009-269429 | 11/2009 |
| JP | 2010-260392 | 11/2010 |
| WO | WO 2009/037237 | 3/2009 |
| WO | WO 2009/053212 | 4/2009 |

* cited by examiner

CONTROL DEVICE OF HYBRID VEHICLE

CROSS-REFERENCE TO RELATED APPLICATIONS

This application is a national phase application of International Application No. PCT/JP2011/050365, filed Jan. 12, 2011, the content of which is incorporated herein by reference.

TECHNICAL FIELD

The present invention relates to a control device of a hybrid vehicle including a clutch in a power transmission path between an engine and a motor generator and particularly to an improvement for reducing a drivers feeling in a simplified manner at the time of wrong engagement of the clutch.

BACKGROUND ART

A hybrid vehicle is known that includes a clutch in a power transmission path between an engine and a motor generator for controlling the power transmission through the power transmission path depending on an engagement state and that interrupts the power transmission through the power transmission path by releasing the clutch during EV running while only the motor generator is used as a drive source for running. Although, for example, a normally close type (normally-closed) hydraulic friction engagement device is preferably used as the clutch, if the clutch is wrongly engaged due to, for example, a failure of an electromagnetic control valve, a drag torque of the engine is generated, resulting in longitudinal acceleration (deceleration G), and a driver may feel uncomfortable. Therefore, a technique has been proposed that reduces a driver's uncomfortable feeling at the time of the wrong engagement of the clutch. For example, this corresponds to a drive controller for a hybrid vehicle described in Patent Document 1. According to this technique, it is considered that when a drag of the clutch is detected, a hydraulic pressure to the clutch can be increased to release the clutch and reduce the driver's uncomfortable feeling.

PRIOR ART DOCUMENT

Patent Document

Patent Document 1: Japanese Laid-Open Patent Publication No. 2009-1172

SUMMARY OF THE INVENTION

Problem to be Solved by the Invention

Figure 8:
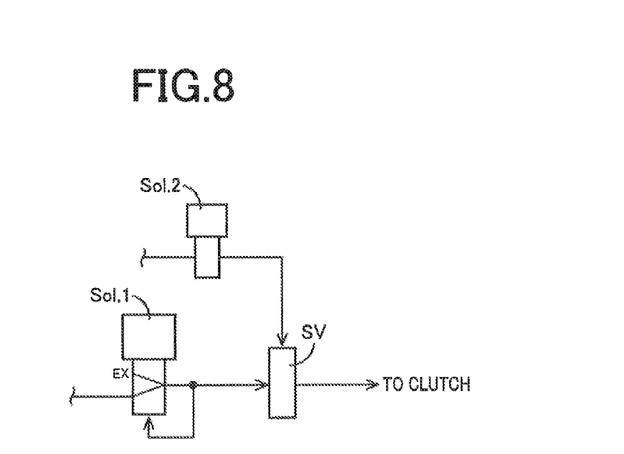
FIG. 8 is a diagram of an example of a hydraulic control circuit for controlling the engagement of the clutch in the conventional technique to compare with the present invention.

In the hybrid vehicle, the engine may be driven even during the EV running while a release instruction for the clutch is output. For example, the engine is allowed to idle for warm-up of a catalytic converter in an exhaust system. In such a case, if the clutch is wrongly engaged due to, for example, a failure of an electromagnetic control valve, acceleration (acceleration G) is generated in a longitudinal direction of a vehicle regardless of accelerator operation and a driver may feel uncomfortable. In this regard, if the engagement of the clutch is controlled with the conventional technique, it takes time from determination of wrong engagement until hydraulic control and, as a result, the generation of the acceleration cannot be prevented and the driver's uncomfortable feeling cannot be suppressed. For example, in a configuration with the hydraulic pressure to the clutch controlled by one linear solenoid valve (single system), the conventional technique has a negative effect because if the wrong engagement of the clutch is attributable to breaking of wire etc., in the linear solenoid valve, the hydraulic pressure to the clutch becomes uncontrollable and the conventional technique cannot deal with the wrong engagement. For example, in a configuration including a linear solenoid valve Sol.1 along with a switching solenoid valve Sol.2 and a switching valve SV as depicted in FIG. 8 to control the hydraulic pressure to the clutch with these valves (duplex system), the conventional technique can deal with the wrong engagement; however, a hydraulic control circuit disadvantageously becomes complicated in this form. Therefore, a control device of a hybrid vehicle is not yet developed at present that reduces a driver's uncomfortable feeling in a simplified manner at the time of wrong engagement of a clutch disposed between an engine and a motor generator.

The present invention was conceived in view of the situations and it is therefore an object of the present invention to provide a control device of a hybrid vehicle reducing a driver's uncomfortable feeling in a simplified manner at the time of wrong engagement of a clutch disposed between an engine and a motor generator.

Means for Solving the Problem

To achieve the object, the present invention provides a control device of a hybrid vehicle having a clutch in a power transmission path between an engine and a motor generator, the clutch controlling power transmission through the power transmission path depending on an engagement state, the hybrid vehicle interrupting the power transmission through the power transmission path by releasing the clutch during EV running while only the motor generator is used as a drive source for running, characterized in that during the EV running while a release instruction for the clutch is output, if the engine is driven, a rotation speed of the engine is maintained within a predetermined rotation speed difference from a rotation speed of the motor generator.

Effects of the Invention

Consequently, during the EV running while a release instruction for the clutch is output, if the engine is driven, a rotation speed of the engine is maintained within a predetermined rotation speed difference from a rotation speed of the motor generator and, therefore, even if the clutch is wrongly engaged, the generation of longitudinal acceleration in the vehicle can be suppressed. Thus, the control device of the hybrid vehicle can be provided that reduces the driver's uncomfortable feeling in a simplified manner at the time of wrong engagement of the clutch disposed between the engine and the motor generator.

Preferably the engine is driven during the EV running for the purpose of warm-up of a catalytic converter. Consequently, when the engine is driven for warm-up of the catalytic converter during the EV running, even if the clutch is wrongly engaged, the generation of longitudinal acceleration in the vehicle can be suppressed.

MODE FOR CARRYING OUT THE INVENTION

A preferred embodiment of the present invention will now be described in detail with reference to the drawings.

First Embodiment

Figure 1:
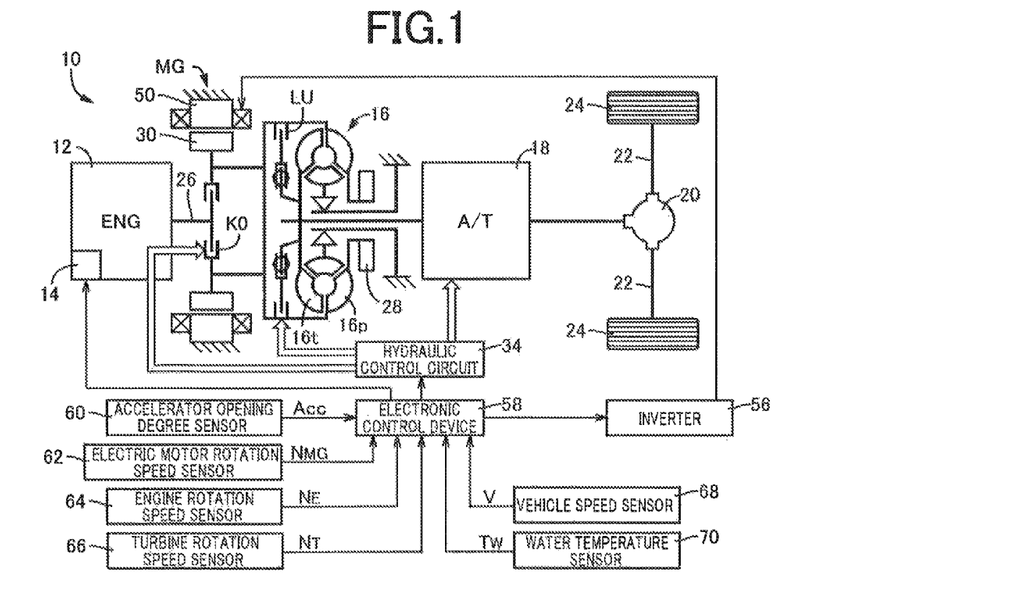
FIG. 1 is a conceptual diagram of a configuration of a drive system according to a control device of a hybrid vehicle that is one embodiment of the present invention.

FIG. 1 is a conceptual diagram of a configuration of a drive system according to a control device of a hybrid vehicle that is one embodiment of the present invention. A hybrid vehicle 10 depicted in FIG. 1 includes an engine 12 and a motor generator MG acting as drive sources and the drive power generated by the engine 12 and the motor generator MG is transmitted through each of a torque converter 16, an automatic transmission 18, a differential gear device 20, and a pair of left and right axles 22 to a pair of left and right drive wheels 24. Because of this configuration, the hybrid vehicle 10 is driven by using at least one of the engine 12 and the motor generator MG as a drive source for running. Therefore, the hybrid vehicle 10 selectively establishes any one of engine running using only the engine 12 as the drive source for running, EV running (motor running) using only the motor generator MG as the drive source for running, and hybrid running using the engine 12 and the motor generator MG as the drive sources for running.

The engine 12 is an internal combustion engine such as cylinder-injection gasoline and diesel engines which fuel is directly injected into a combustion chamber, for example, and is preferably started by driving the motor generator MG. To control the drive (output torque) of the engine 12, an output control device 14 is disposed that includes a throttle actuator 76 providing opening/closing control of an electronic throttle valve 74 (see FIG. 4), an ISC valve 78 opening/closing a bypass route 80 disposed in an intake pipe 72 (see FIG. 4), a fuel injection device not depicted providing fuel injection control, and an ignition device not depicted providing ignition timing control. The output control device 14 controls the opening/closing of the electronic throttle valve 74 with the throttle actuator 76 for throttle control in accordance with instructions supplied from an electronic control device 58 described later, controls the opening/closing of the ISC valve 78 for idle rotation speed control, controls fuel injection by the fuel injection device for the fuel injection control, and controls timing of ignition by the ignition device for the ignition timing control, thereby providing the output control of the engine 12.

The motor generator MG is an electric motor having functions of a motor (mover) generating a drive force and a generator (electric generator) generating a reactive force, and a power transmission path between the engine 12 and the motor generator MG is disposed with a clutch K0 controlling the power transmission through the power transmission path depending on an engagement state. In particular, a crankshaft 26 is an output member of the engine 12 and is selectively coupled via the clutch K0 to a rotor 30 of the motor generator MG. The rotor 30 of the motor generator MG is coupled to a front cover 32 that is an input member of the torque convertor 16.

The clutch K0 is, for example, a multiplate hydraulic friction engagement device subjected to engagement control of a hydraulic actuator and has an engagement state thereof controlled between engagement (complete engagement), slip engagement, and release (complete release) in accordance with an oil pressure supplied from a hydraulic control circuit 34. The engagement of the clutch K0 causes the power transmission (connection) through the power transmission path between the crankshaft 26 and the front cover 32 while the release of the clutch K0 interrupts the power transmission through the power transmission path between the crankshaft 26 and the front cover 32. The slip engagement of the clutch K0 causes the power transmission corresponding to a transmission torque of the clutch K0 through the power transmission path between the crankshaft 26 and the front cover 32.

The automatic transmission 18 is a stepped automatic transmission in which any one of a plurality of predefined shift stages (gear ratios) is selectively established, for example, and is configured with a plurality of engagement elements for the gear shifting. For example, the automatic transmission 18 includes a plurality of hydraulic friction engagement devices such as multiplate clutches and brakes subjected to engagement control of hydraulic actuators and a plurality of the hydraulic friction engagement devices are engaged or released in accordance with the oil pressure supplied from the hydraulic control circuit 34, thereby selectively establishing any one of a plurality of (e.g., first speed to sixth speed) forward shift stages (forward gear stages, forward running gear stages) or a backward shift stage (backward gear stage, backward running gear stage) in accordance with a combination of the coupling states of the hydraulic friction engagement devices.

Figure 2:
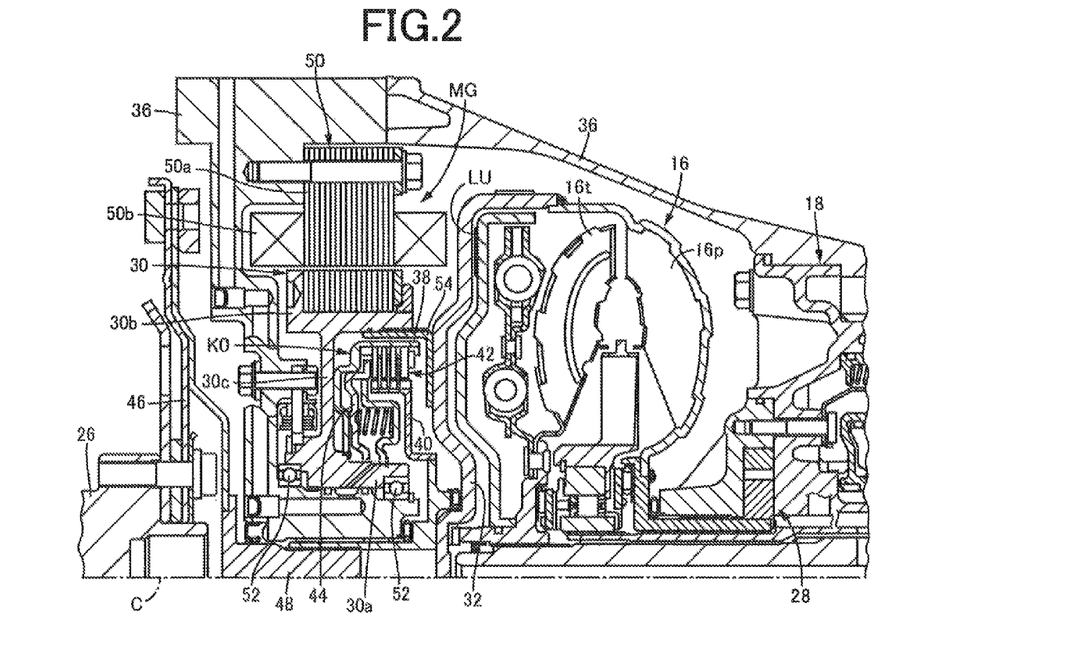
FIG. 2 is a partially cutaway cross-sectional view for explaining a configuration around the motor generator and the torque converter in the hybrid vehicle of FIG. 1.

FIG. 2 is a partially cutaway cross-sectional view for explaining a configuration around the motor generator MG and the torque converter 16 in the hybrid vehicle 10 of FIG. 1. The motor generator MG, the torque converter 16, the automatic transmission 18, and the crankshaft 26 are configured substantially symmetrically relative to an axial center C common thereto and lower halves from the axial center C are not depicted in FIG. 2. As depicted in FIG. 2, the motor generator MG, the torque converter 16, and the automatic transmission 18 are all housed in a transmission case 36. The transmission case 36 is a split-type case made of die-cast aluminum, for example, and is fixed to a non-rotating member such as a vehicle body.

The clutch K0 includes a cylindrical clutch drum 38, a cylindrical clutch hub 40 having a diameter smaller than the clutch drum 38 and disposed concentrically with and relatively rotatably to the clutch drum 38, a friction engagement member 42 disposed in an annular gap between the clutch drum 38 and the clutch hub 40, and a clutch piston 44 pressing the friction engagement member 42 in the axial center C direction. The clutch drum 38 is integrally fixed to the boss portion 30a in the rotor 30 of the motor generator MG by welding, for example, and is integrally rotated with the rotor 30. The friction engagement member 42 includes a plurality of annular plate-shaped separators engaged relatively non-rotatably with the clutch drum 38, and a plurality of annular plate-shaped friction plates each disposed between the multiple separators and engaged relatively non-rotatably with the clutch hub 40.

In the clutch K0 configured in this way, the friction engagement member 42 is pressed by the clutch piston 44 in the axial center C direction and the separators and the friction plates are frictionally engaged with each other, thereby suppressing relative rotation between the clutch drum 38 and the clutch hub 40. Therefore, the frictional engagement between the separators and the friction plates of the friction engagement member 42 enables mutual power transmission between the clutch drum 38 and the clutch hub 40. The clutch K0 is preferably a normally close type (normally-closed) clutch engaged while no instruction is output from the electronic control device 58 described later.

The crankshaft 26 has an output end portion, i.e., one end portion closer to the motor generator MG, coupled via a drive plate 46 etc., to a rotation shaft 48 rotated integrally with the clutch hub 40 of the clutch K0. Therefore, the crankshaft 26 and the clutch hub 40 are coupled via the drive plate 46, the rotation shaft 48, etc., to each other so as to rotate integrally around the common axial center C. A pump impeller 16p of the torque converter 16 is coupled to a mechanical hydraulic pump 28, and an oil pressure is generated by the hydraulic pump 28 in accordance with the rotation of the pump impeller 16p and is supplied as an original pressure to the hydraulic control circuit 34.

Between the pump impeller 16p and a turbine impeller 16t of the torque converter 16, a lockup clutch LU is disposed for direct coupling so that the pump impeller 16p and the turbine impeller 16t are integrally rotated. The lockup clutch LU has an engagement state thereof controlled between engagement (complete engagement), slip engagement, and release (complete release) in accordance with the oil pressure supplied from the hydraulic control circuit 34. Therefore, the lockup clutch LU corresponds to a second clutch disposed in the power transmission path between the motor generator MG and the drive wheels 24 to control the power transmission through the power transmission path depending on the engagement state.

The motor generator MG includes the rotor 30 supported rotatably around the axial center C by the transmission case 36 on the outer circumferential side of the rotation shaft 48 and a stator 50 integrally fixed to the transmission case 36 on the outer circumferential side of the rotor 30. The rotor 30 includes the cylindrical boss portion 30a supported rotatably via a pair of bearings 52 by the transmission case 36, a rotor portion 30b having a plurality of annular steel plates stacked in the axial center C direction with a slight gap from the stator 50 on the inner circumferential side of the stator 50, and a coupling portion 30c integrally coupling the boss portion 30a and the rotor portion 30b. The rotor 30 is coupled to the front cover 32 via a transmitting member 54 coupled to the inner circumferential side of the rotor portion 30b and fixed integrally to the front cover 32 by welding, for example. The stator 50 includes a core 50a having a plurality of annular steel plates stacked in the axial center C direction and a plurality of coils 50b wound around a portion in a circumferential direction of an inner circumferential portion of the core 50a and disposed serially in the circumferential direction.

The core 50a is integrally fixed to the transmission case 36 at a plurality of positions in the circumferential direction by bolts etc.

The motor generator MG configured in this way is connected via an inverter 56 depicted in FIG. 1 to an electric storage device not depicted such as a battery and a capacitor, and a drive current supplied to the coils 50b is adjusted by controlling the inverter 56 by the electronic control device 58 described later, thereby controlling the drive of the motor generator MG. In other words, the inverter 56 is controlled by the electronic control device 58, thereby increasing and decreasing the output torque of the motor generator MG. Although the output torque from the motor generator MG is output only to the torque convertor 16 while the clutch K0 is released (not engaged), a portion of the output torque is output to the torque converter 16 and the other portion is output to the engine 12 while the clutch K0 is engaged.

When the engine 12 is started, the engine 12 is rotationally driven by a torque for engine start transmitted from the motor generator MG via the clutch K0 and, as a result, while an engine rotation speed $N_E$ is increased, the engine 12 is started by controlling engine ignition, fuel supply, etc. Therefore, the engine 12 is started by rotationally driving the engine 12 with a torque acquired from explosion energy due to ignition and a torque acquired from engagement energy due to the clutch K0, i.e., the engine starting torque transmitted from the motor generator MG via the clutch K0.

The hybrid vehicle 10 includes a control system as exemplarily illustrated in FIG. 1. The electronic control device 58 depicted in FIG. 1 includes a so-called microcomputer including a CPU, a RAM, a ROM, and an input/output interface, and the CPU executes signal processes in accordance with programs stored in advance in the ROM while utilizing a temporary storage function of the RAM, thereby providing basic control such as the drive control of the engine 12, the start control of the engine 12, the drive control of the motor generator MG the shift control of the automatic transmission 18, the engagement force control of the clutch K0, and the engagement control of the lockup clutch LU, along with various types of control such as engine rotation speed control during EV running of this embodiment described later. Therefore, the electronic control device 58 functions as a control device of the hybrid vehicle 10 depicted in FIG. 1.

As depicted in FIG. 1, the electronic control device 58 is supplied with various input signals detected by sensors disposed on the hybrid vehicle 10. For example, the electronic control device 58 receives inputs of a signal indicative of an accelerator opening degree $A_{CC}$ detected by an accelerator opening degree sensor 60, a signal indicative of a rotation speed (electric motor rotation speed) $N_{MG}$ of the motor generator MG detected by an electric motor rotation speed sensor 62, a signal indicative of the rotation speed (engine rotation speed) $N_E$ of the engine 12 detected by an engine rotation speed sensor 64, a signal indicative of a rotation speed (turbine rotation speed) $N_T$ of the turbine impeller 16t of the torque convertor 16 detected by a turbine rotation speed sensor 66, a signal indicative of a vehicle speed V detected by a vehicle speed sensor 68, and a signal indicative of a cooling water temperature $T_W$ of the engine 12 detected by a water temperature sensor 70. The rotation speed $N_{MG}$ of the motor generator MG detected by the electric motor rotation speed sensor 62 is an input rotation speed of the torque converter 16 and corresponds to the rotation speed of the pump impeller 16p of the torque converter 16. The rotation speed $N_T$ of the turbine impeller 16t detected by the turbine rotation speed sensor 66 is an output rotation speed of the torque converter 16 and corresponds to an input rotation speed of the automatic transmission 18.

The electronic control device 58 supplies various output signals to the devices disposed on the hybrid vehicle 10. For example, the electronic control device 58 supplies to the portions a signal supplied to the output control device 14 of the engine 12 for the drive control of the engine 12, a signal supplied to the inverter 56 for the drive control of the motor generator MG, a signal supplied to a plurality of electromagnetic control valves in the hydraulic control circuit 34 for the shift control of the automatic transmission 18, a signal supplied to a first linear solenoid valve SL1 (see FIG. 3) in the hydraulic control circuit 34 for the engagement control of the clutch K0, and a signal supplied to a second linear solenoid valve SL2 (see FIG. 3) in the hydraulic control circuit 34 for the engagement control of the lockup clutch LU.

Figure 3:
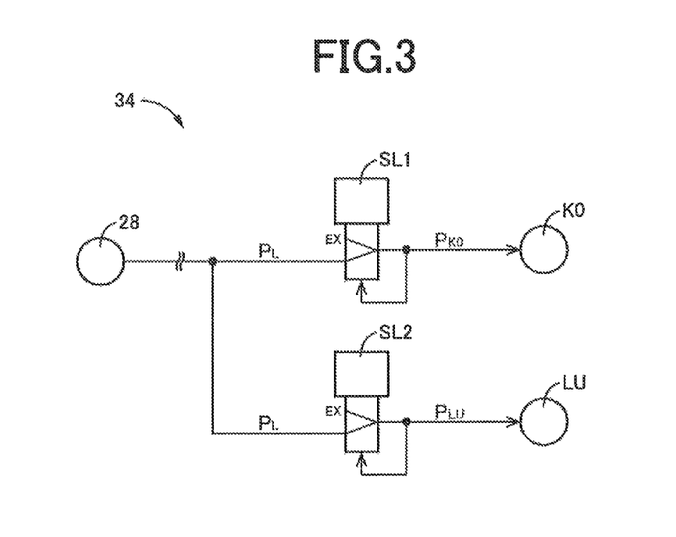
FIG. 3 is a diagram for explaining a configuration related to the hydraulic control of the clutch and the lockup clutch in the hydraulic control circuit included in the hybrid vehicle of FIG. 1.

FIG. 3 is a diagram for explaining a configuration related to the hydraulic control of the clutch K0 and the lockup clutch LU in the hydraulic control circuit 34. As depicted in FIG. 3, the hydraulic control circuit 34 includes the first linear solenoid valve SL1 adjusting an oil pressure $P_{K0}$ supplied to a hydraulic actuator included in the clutch K0 and the second linear solenoid valve SL2 adjusting an oil pressure $P_{LU}$ supplied to a hydraulic actuator included in the lockup clutch LU. Both the first linear solenoid valve SL1 and the second linear solenoid valve SL2 use as an original pressure, for example, a line pressure $P_L$ adjusted from an oil pressure supplied from the hydraulic pump 28 and have a communication state between an input port and an output port or a drain port changed in accordance with an electromagnetic power of a solenoid controlled based on an instruction signal supplied from the electronic control device 58, thereby adjusting the oil pressures $P_{K0}$ and $P_{LU}$, respectively, corresponding to the instruction signal and supplying the oil pressures to the hydraulic actuators for controlling the respective engagements of the clutch K0 and the lockup clutch LU.

Figure 4:
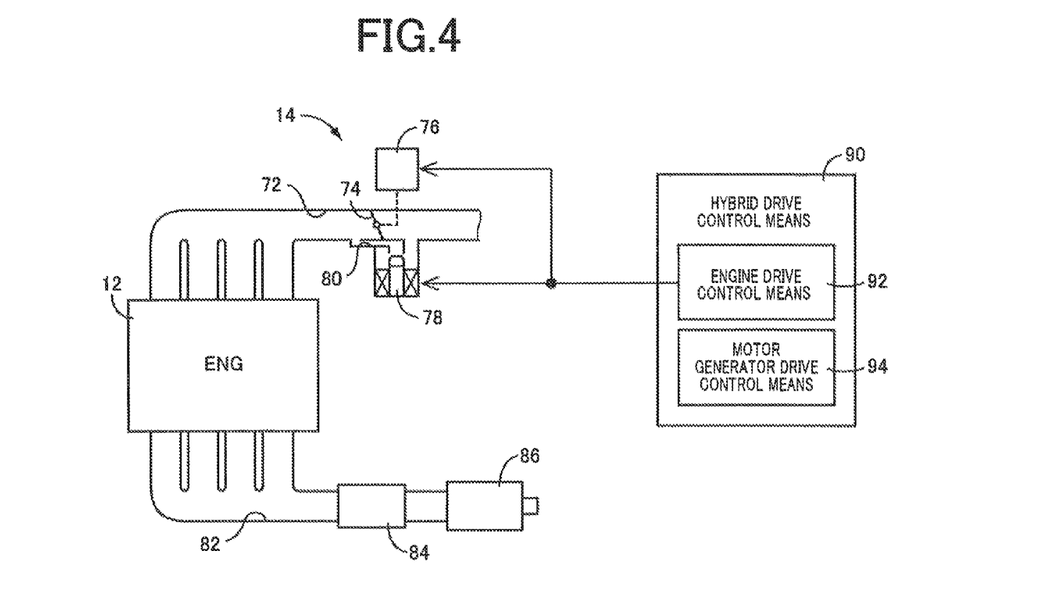
FIG. 4 is a functional block diagram for explaining a main portion of the output control device in the hybrid vehicle of FIG. 1 along with a Main portion of a control function included in the electronic control device.

FIG. 4 is a functional block diagram for explaining a main portion of the output control device 14 along with a main portion of a control function included in the electronic control device 58. As depicted in FIG. 4, the output control device 14 includes the electronic throttle valve 74 disposed in the intake pipe 72 of the engine 12 and set to an opening angle, i.e., a throttle opening degree $\theta_{TH}$, corresponding to the accelerator opening degree $A_{CC}$ detected by the accelerator opening degree sensor 60. The output control device 14 also includes the throttle actuator 76 driving the electronic throttle valve 74 in accordance with the accelerator opening degree $A_{CC}$ to control the throttle opening degree $\theta_{TH}$. The bypass route 80 disposed in the intake pipe 72 and bypassing the electronic throttle valve 74 for the idle rotation speed control is disposed with the ISC (idle rotation speed control) valve 78 controlling an intake air amount while the electronic throttle valve 74 is completely closed, so as to control an idle rotation speed $N_{EIDL}$ of the engine 12.

As depicted in FIG. 4, an exhaust pipe 82 of the engine 12 is disposed with a catalytic converter 84 oxidizing CO, HC, etc., in exhaust air in the exhaust pipe 82 with an oxidation catalyst method and a muffler 86 disposed on a downstream end portion of the exhaust pipe 82. The catalytic converter 84 is constructed by housing in a case, for example, honeycomb (honeycomb-shaped) or granular activated alumina carriers to which catalytic material such as platinum and palladium is attached so as to allow passage of the exhaust air in the exhaust pipe 82.

A hybrid drive control means 90 depicted in FIG. 4 provides hybrid drive control in the hybrid vehicle 10. Therefore, as depicted in FIG. 4, the hybrid drive control means 90 includes an engine drive control means 92 controlling the drive (output torque) of the engine 12 via the output control device 14, and a motor generator drive control means 94 controlling the drive of the motor generator MG via the inverter 56 and provides the drive control of the hybrid vehicle 10 with the engine 12 and the motor generator MG via the engine drive control means 92 and the motor generator drive control means 94. For example, the hybrid drive control means 90 selectively establishes, in accordance with a running state of the hybrid vehicle 10, an EV running mode in which only the motor generator MG is used as the drive source for running with the engine 12 stopped, an engine running mode in which only the engine 12 is used as the drive source for running, and the hybrid running mode in which both the engine 12 and the motor generator MG are used as the drive sources for running with the motor generator MG performing regeneration (electric generation) depending on the running state.

In the EV running mode, the hybrid drive control means 90 uses only the motor generator MG as the drive source for running to provide the running control of the hybrid vehicle 10. In particular, the hybrid drive control means 90 determines a required output shaft torque from a preliminarily stored drive power map based on the accelerator opening degree $A_{CC}$ considered as an output request amount from a driver, the vehicle speed V, etc., and calculates a required drive power from the required output shaft torque in consideration of a charge request value etc. The hybrid drive control means 90 controls the drive (output torque) of the motor generator MG such that the required drive power is acquired. In the EV running mode, the drive of the engine 12 is basically stopped and the clutch K0 is released (completely released). As a result, the power transmission path between the engine 12 and the motor generator MG is interrupted and the power is not transmitted from the engine 12 to the lockup clutch 16 side while the torque is not transmitted from the lockup clutch 16 side to the engine 12.

In the engine running mode, the hybrid drive control means 90 uses only the engine 12 as the drive source for running to provide the running control of the hybrid vehicle 10. In particular, the hybrid drive control means 90 calculates target engine output such that the required drive power obtained as described above is acquired, and controls the drive of the engine 12 to achieve the engine rotation speed $N_E$ and the engine torque for acquiring the target engine output while operating the engine 12 along an optimum fuel consumption rate curve (fuel consumption map, relationship) of the engine 12 empirically obtained and stored in advance such that both the drivability and the fuel consumption property are satisfied. In the engine running mode, the clutch K0 is engaged (completely engaged). Although the motor generator MG is idled, the motor generator MG may be operated to perform regeneration depending on a running state.

In the hybrid running mode, the hybrid drive control means 90 uses both the engine 12 and the motor generator MG as the drive sources for running to provide the running control of the hybrid vehicle 10. In particular, the hybrid drive control means 90 calculates target engine output such that the required drive power obtained as described above is acquired in consideration of a transmission loss, an accessory load, an assist torque of the motor generator MG etc., and controls the drive of the engine 12 and the motor generator MG to achieve the engine rotation speed $N_E$ and the engine torque for acquiring the target engine output while operating the engine 12 along the optimum fuel consumption rate curve (fuel consumption map, relationship) of the engine 12 empirically obtained and stored in advance such that both the drivability and the fuel consumption property are satisfied.

The hybrid drive control means 90 controls the regeneration (electric generation) by the motor generator MG. In particular, if the execution of the regeneration is determined from a predefined relationship based on the accelerator opening degree $A_{CC}$ considered as an output request amount from a driver, etc., the hybrid drive control means 90 controls the operation of the motor generator MG such that the motor generator MG performs the regeneration. The electric energy generated by the regeneration of the motor generator MG is accumulated via the inverter 56 in the electric storage device not depicted. When the motor generator MG is used as the drive source, the electric energy is supplied from the electric storage device via the inverter 56 to the motor generator MG to generate drive power.

In the EV running mode, the engine drive control means 92 drives the engine 12 as needed. In particular, the engine 12 is driven for a different purpose other than the drive source for running (without applying a running load) while the clutch K0 is released. For example, if a predefined condition is satisfied (e.g., a temperature detected by a temperature sensor not depicted disposed near the catalytic converter 84 is equal to or lower than a predetermined temperature) and it is determined that the catalytic converter 84 must be warmed up, the engine 12 is driven for the warmup of the catalytic converter 84 while the clutch K0 remains released. Preferably, the engine 12 is subjected to the idle toque control (allowed to idle) while the idle rotation speed $N_{EIDL}$ of the engine 12 is controlled via the ISC valve 78 included in the output control device 14.

Figure 5:
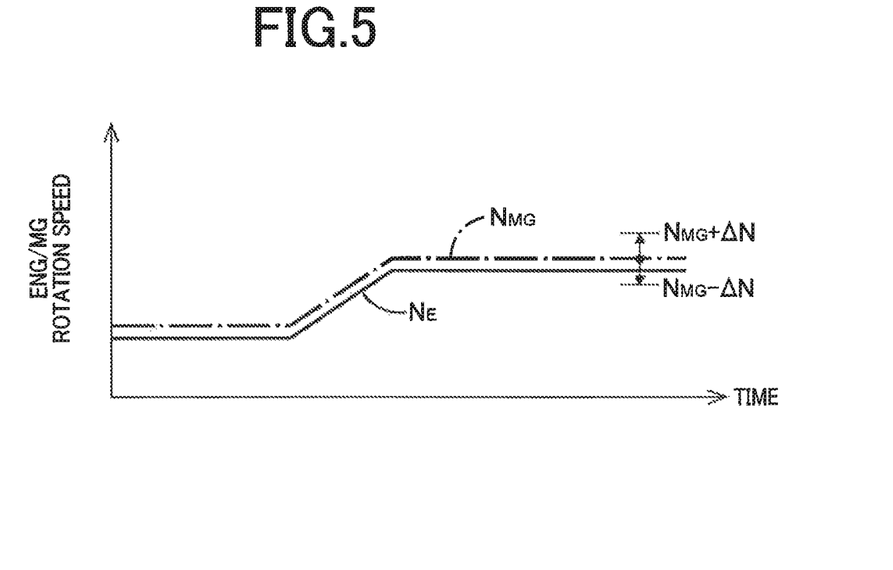
FIG. 5 is a time chart for explaining the engine rotation speed control during EV running by the electronic control device in the hybrid vehicle of FIG. 1.

FIG. 5 is a time chart for explaining an example of the engine rotation speed control of this embodiment by the electronic control device 58. In the EV running mode in which the release instruction for the clutch K0 is output, for example, if the engine 12 is driven for the warm-up of the catalytic converter 84, etc., the engine drive control means 92 maintains the rotation speed $N_E$ of the engine 12 within a predetermined rotation speed difference from the rotation speed $N_{MG}$ of the motor generator MG. Therefore, as depicted in the time chart of FIG. 5, the drive of the engine 12 is controlled such that the rotation speed $N_E$ of the engine 12 falls within a range of $N_{MG} \pm \Delta N$ based on the rotation speed $N_{MG}$ of the motor generator MG. This control is preferably provided by controlling the idle rotation speed $N_{EIDL}$ of the engine 12 via the ISC valve 78 included in the output control device 14. The control may also be provided by controlling the throttle opening degree $\theta_{TH}$ of the electronic throttle valve 74 via the throttle actuator 76 included in the output control device 14.

In the EV running mode in which the release instruction for the clutch K0 is output, for example, when the engine 12 is driven for the warm-up of the catalytic converter 84 etc., if the clutch K0 is wrongly engaged due to, for example, a failure of the first linear solenoid valve SL1 included in the hydraulic control circuit 34, in the prior art, acceleration (acceleration G) may be generated in a longitudinal direction of a vehicle regardless of accelerator operation and a driver may feel uncomfortable, resulting in reduction of drivability. On the other hand, in the technique of the present embodiment, when the engine 12 is driven in the EV running mode in which the release instruction for the clutch K0 is output, the engine drive control means 92 maintains the rotation speed $N_E$ of the engine 12 within a predetermined rotation speed difference ($\pm \Delta N$) from the rotation speed $N_{MG}$ of the motor generator MG as depicted in the time chart of FIG. 5, for example. Therefore, if the clutch K0 is wrongly engaged, since the engine 12 and the motor generator MG are set to the rotation speeds considered as substantially synchronous rotation from the beginning, acceleration is not generated at a level causing a driver to feel uncomfortable and the reduction in drivability is avoided. In other words, the driver's uncomfortable feeling at the time of wrong engagement of the clutch K0 can preferably be suppressed.

Figure 6:
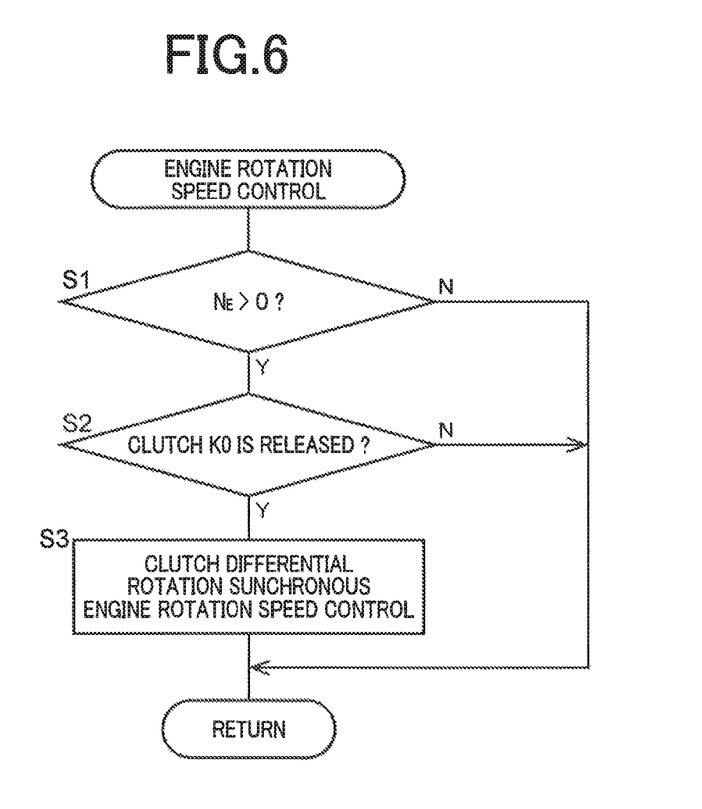
FIG. 6 is a flowchart for explaining an example of the engine rotation speed control during EV running by the electronic control device in the hybrid vehicle of FIG. 1.

FIG. 6 is a flowchart for explaining a main portion of the engine rotation speed control during EV running by the electronic control device 58 and is repeatedly executed in a predetermined cycle.

First, at step (hereinafter, step will be omitted) S1, it is determined whether the engine rotation speed N of the engine 12 detected by the engine rotation speed sensor 64 is greater than zero, i.e., whether the engine 12 is rotating. If the determination at S1 is negative, this routine is terminated and, if the determination at S1 is affirmative, it is determined at S2 whether the clutch K0 is released, i.e., the release instruction for the clutch K0 is output. If the determination at S2 is negative, this routine is terminated and, if the determination at S2 is affirmative, at S3 corresponding to the operation of the engine drive control means 92, the engine rotation speed control is provided so that the rotation speed $N_E$ of the engine 12 is maintained within a predetermined rotation speed difference, for example, within $\pm \Delta N$, from the rotation speed $N_{MG}$ of the motor generator MG, before this routine is terminated.

As described above, according to this embodiment, during the EV running while the release instruction for the clutch K0 is output, if the engine 12 is driven, the rotation speed $N_E$ of the engine 12 is maintained within the predetermined rotation speed difference $\Delta N$ from the rotation speed $N_{MG}$ of the motor generator MG and, therefore, even if the clutch K0 is wrongly engaged, the generation of longitudinal acceleration in the vehicle can be suppressed. Thus, the control device of the hybrid vehicle 10 can be provided that reduces the driver's uncomfortable feeling in a simplified manner at the time of wrong engagement of the clutch K0 disposed between the engine 12 and the motor generator MG.

Since the drive of the engine 12 during the EV running is performed for the purpose of warm-up of the catalytic converter 84, when the engine 12 is driven for warm-up of the catalytic converter 84 during the EV running, even if the clutch K0 is wrongly engaged, the generation of longitudinal acceleration in the vehicle can be suppressed.

Another preferred embodiment of the present invention will be described in detail with reference to the drawings. In the following description, the portions common to the embodiments are denoted by the same reference numerals and will not be described.

Second Embodiment

Figure 7:
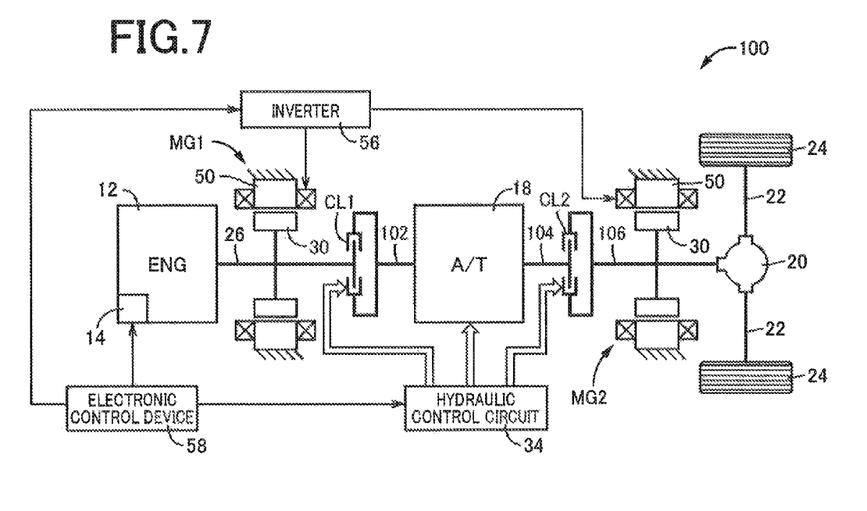
FIG. 7 is a conceptual diagram of a configuration of a drive system according to another hybrid vehicle to which the present invention is preferably applied.

FIG. 7 is a conceptual diagram of a configuration of a drive system according to another hybrid vehicle 100 to which the present invention is preferably applied. As depicted in FIG. 7, the hybrid vehicle 100 of the present embodiment includes a first clutch CL1 in a power transmission path between the crankshaft 26 of the engine 12 and an input shaft 102 of the automatic transmission 18 for controlling the power transmission through the power transmission path depending on an engagement state. The hybrid vehicle 100 includes a second clutch CL2 in a power transmission path between an output shaft 104 of the automatic transmission 18 and a drive shaft 106 that is an input shaft of the differential gear device 20 for controlling the power transmission through the power transmission path depending on an engagement state. The hybrid vehicle 100 includes a first electric motor MG1 and a second electric motor MG2 with the rotor 30 of the first electric motor MG1 and the rotor 30 of the second electric motor MG2 coupled to the crankshaft 26 of the engine 12 and the drive shaft 106, respectively.

Each of the first clutch CL1 and the second clutch CL2 is, for example, a multiplate hydraulic friction engagement device subjected to engagement control of a hydraulic actuator and has an engagement state thereof controlled between engagement (complete engagement), slip engagement, and release (complete release) in accordance with an oil pressure supplied from the hydraulic control circuit 34. The engagement of the first clutch CL1 causes the power transmission (connection) through the power transmission path between the crankshaft 26 of the engine 12 and the input shaft 102 of the automatic transmission 18 while the release of the first clutch CL1 interrupts the power transmission through the power transmission path between the crankshaft 26 and the input shaft 102. The slip engagement of the first clutch CL1 causes the power transmission corresponding to a transmission torque of the first clutch CL1 through the power transmission path between the crankshaft 26 and the input shaft 102. The engagement of the second clutch CL2 causes the power transmission (connection) through the power transmission path between the output shaft 104 of the automatic transmission 18 and the drive shaft 106 while the release of the second clutch CL2 interrupts the power transmission through the power transmission path between the output shaft 104 and the drive shaft 106. The slip engagement of the second clutch CL2 causes the power transmission corresponding to a transmission torque of the second clutch CL2 through the power transmission path between the output shaft 104 and the drive shaft 106.

The first electric motor MG1 is an electric motor at least having a function of a generator (electric generator) generating a reactive force and is preferably a motor generator having a function of a motor (mover) generating a drive force in addition to the function of a generator. The second electric motor MG2 is an electric motor at least having a function of a motor generating a drive force and is preferably a motor generator having a function of a generator generating a reactive force. Both the first electric motor MG1 and the second electric motor MG2 are connected via the inverter 56 to an electric storage device not depicted such as a battery and a capacitor and the actuation (drive or regeneration) controlled by controlling the inverter 56 by the electronic control device 58.

During the EV running in the hybrid vehicle 100 depicted in FIG. 7, for example, only the second electric motor MG2 is used as the drive source for running. Therefore, while at least one or, preferably, both of the first clutch CL1 and the second clutch CL2 are released, the power running control of the second electric motor MG2 is provided via the inverter 56 by the hybrid drive control means 90 (the motor generator drive control means 94). In this EV running, the drive of the engine 12 and the first electric motor MG1 is basically stopped. Therefore, one or both of the first clutch CL1 and the second clutch CL2 correspond to a clutch disposed in the power transmission path between the engine 12 and the motor generator MG2 and, during the EV running in the hybrid vehicle 100, the power transmission through the power transmission paths is interrupted by releasing one or both of the first clutch CL1 and the second clutch CL2.

During the EV running in the hybrid vehicle 100, the engine drive control means 92 drives the engine 12 as needed. In particular, the engine 12 is driven for a different purpose other than the drive source for running (without applying a running load) while one or both of the first clutch CL1 and the second clutch CL2 are released. The drive of the engine 12 during the EV running is performed for the purpose of warm-up of the catalytic converter 84 as is the case with the embodiment, for example. Preferably, the drive of the engine 12 (series HV running) is also performed for the regeneration (electric generation) of the MG1. Therefore, if a predefined condition, for example, SOC of the electric storage device not depicted becomes equal to or less than a predetermined value etc., and it is determined that the electric storage device must be charged, the engine 12 is driven to perform the electric generation with the first electric motor MG1 while one or both of the first clutch CL1 and the second clutch CL2 remain released. Preferably, the engine 12 is subjected to the idle toque control (allowed to idle) while the idle rotation speed $N_{EIDL}$ of the engine 12 is controlled via the ISC valve 78 included in the output control device 14.

During the EV running in the hybrid vehicle 100, for example, if the engine 12 is driven for the warm-up of the catalytic converter 84 or the regeneration of the first electric motor MG1 etc., in the EV running mode in which the release instruction for one or both of the first clutch CL1 and the second clutch CL2 is output, the engine drive control means 92 maintains the rotation speed $N_E$ of the engine 12 within a predetermined rotation speed difference from a rotation speed $N_{MG2}$ of the second electric motor MG2. Therefore, the drive of the engine 12 is controlled such that the rotation speed $N_E$ of the engine 12 falls within a range of $N_{MG2} \pm \Delta N$ based on the rotation speed $N_{MG1}$ of the second electric motor MG2. This control is preferably provided by controlling the idle rotation speed $N_{EIDL}$, of the engine 12 via the ISC valve 78 included in the output control device 14. The control may also be provided by controlling the throttle opening degree $\theta_{TH}$ of the electronic throttle valve 74 via the throttle actuator 76 included in the output control device 14.

As described above, according to this embodiment. Since the drive of the engine 12 during the EV running is performed for the purpose of the regeneration by the first electric motor MG1, when the engine 12 is driven for the charge of the electric storage device during the EV running, even if the clutch CL1 and CL2 disposed in the power transmission path between the engine 12 and the second electric motor MG2 is wrongly engaged, the generation of longitudinal acceleration in the vehicle can be suppressed.

Although the preferred embodiments of the present invention have been described in detail with reference to the drawings, the present invention is not limited thereto and is implemented in other forms.

For example, although the clutch K0 etc., disposed in the power transmission path between the engine 12 and the motor generator MG are hydraulic friction engagement devices having an engagement state hydraulically controlled in the embodiments, for example, an electromagnetic clutch or a magnetic particle clutch having an engagement state electromagnetically controlled may be disposed in the power transmission path between the engine 12 and the motor generator MG. Therefore, the present invention may widely be applied to hybrid vehicles with a clutch included in a power transmission path between an engine and a motor generator and controlling power transmission through the power transmission path.

Although the present invention is applied to the hybrid vehicle 10 including the stepped automatic transmission 18 including a plurality of the hydraulic friction engagement devices in the examples described in the embodiments, for example, the present invention is preferably applied to a hybrid vehicle including a CVT such as a belt type continuously variable transmission and a toroidal continuously variable transmission as the automatic transmission. The present invention may also be applied to a hybrid vehicle in a form having a mutual electric path between multiple electric motors allowing the multiple electric motors to act as an electric continuously variable transmission.

Although the engine drive control means 92 drives the engine 12 for warm-up of the catalytic converter 84 during running in the EV running mode in the embodiments, the engine 12 may be driven, for example, for heating in a vehicle in such a case when the temperature in the vehicle becomes equal to or less than a predetermined value or for output of idling sound notifying pedestrians of an approaching car while running in a residential street. Therefore, the present invention is widely applied to hybrid vehicles having the engine 12 driven for a different purpose other than the drive source for running (without applying a running load) during EV running while only the motor generator MG etc., are used as the drive source for running.

Although not exemplarily illustrated one by one, the present invention is implemented with various modifications applied without departing from the spirit thereof.

DESCRIPTION OF REFERENCE NUMERALS 10, 100: hybrid vehicle 12: engine 14: output control device 16: torque converter 16p: pump impeller 16t: turbine impeller 18: automatic transmission 20: differential gear device 22: axle 24: drive wheel 26: crankshaft 28: hydraulic pump 30: rotor 30a: boss portion 30b: rotor portion 30c: coupling portion 32: front cover 34: hydraulic control circuit 36: transmission case 38: clutch drum 40: clutch hub 42: friction engagement member 44: clutch piston 46: drive plate 48: rotation shaft 50: stator 50a: core 50b: coil 52: bearing 54: transmitting member 56: inverter 58: electronic control device 60: accelerator opening degree sensor 62: electric motor rotation speed sensor 64: engine rotation speed sensor 66: turbine rotation speed sensor 68: vehicle speed sensor 70: water temperature sensor 72: intake pipe 74: electronic throttle valve 76: throttle actuator 78: ISC valve 80: bypass route 82: exhaust pipe 84: catalytic converter 86: muffler 90: hybrid drive control means 92: engine drive control means 94: motor generator drive control means 102: input shaft 104: output shaft 106: drive shaft CL1: first clutch CL2: second clutch K0: clutch LU: lockup clutch MG: motor generator MG1: first electric motor MG2: second electric motor SL1: first linear solenoid valve SL2: second linear solenoid valve Sol.1: linear solenoid valve (conventional technique) Sol.2: switching solenoid valve (conventional technique) SV: switching valve (conventional technique)

The invention claimed is:

1. A control device of a hybrid vehicle having a clutch in a power transmission path between an engine and a motor generator, the clutch controlling power transmission through the power transmission path depending on an engagement state, the hybrid vehicle interrupting the power transmission through the power transmission path by releasing the clutch during EV running while only the motor generator is used as a drive source for running, the engine being driven, such that a rotation speed of the engine is maintained within a predetermined rotation speed difference from a rotation speed of the motor generator during the EV running while a release instruction for the clutch is output, and wherein during the EV running, it is determined whether warm-up of a catalytic converter is needed, and the engine is driven when it is determined that the warm-up of the catalytic converter is needed.

* * * * *